(12) United States Patent
Gamal et al.

(10) Patent No.: US 7,152,334 B2
(45) Date of Patent: Dec. 26, 2006

(54) CONTROLLED SUPPORT FRAME TO POSITION A LASER LEVEL

(75) Inventors: Albert Gamal, Le Mesnil le roi (FR); Roland Franclet, Le Mesnil le Roi (FR)

(73) Assignee: Agatec, Le Mesnil le Roi (FR)

( * ) Notice: Subject to any disclaimer, the term of this patent is extended or adjusted under 35 U.S.C. 154(b) by 0 days.

(21) Appl. No.: 11/068,053

(22) Filed: Mar. 1, 2005

(65) Prior Publication Data

US 2006/0107539 A1    May 25, 2006

(30) Foreign Application Priority Data

Nov. 22, 2004    (FR) .................................. 04 12373

(51) Int. Cl.
  *G01C 5/00* (2006.01)
(52) U.S. Cl. .................... 33/290; 33/286; 33/DIG. 21
(58) Field of Classification Search .......... 33/280–283, 33/285–286, 290–291, 276, DIG. 21
  See application file for complete search history.

(56) References Cited

U.S. PATENT DOCUMENTS

| 5,903,345 | A | 5/1999 | Butler et al. | |
|---|---|---|---|---|
| 6,241,360 | B1 | 6/2001 | Merrell | |
| 6,427,347 | B1 * | 8/2002 | Butler, Sr. | 33/286 |
| 6,871,408 | B1 * | 3/2005 | Malard et al. | 33/286 |
| 6,922,901 | B1 * | 8/2005 | Chou et al. | 33/290 |
| 6,931,739 | B1 * | 8/2005 | Chang et al. | 33/286 |
| 7,065,890 | B1 * | 6/2006 | Chang | 33/286 |
| 2003/0051355 | A1 * | 3/2003 | Phuly et al. | 33/286 |
| 2006/0048399 | A1 * | 3/2006 | Chang | 33/286 |

FOREIGN PATENT DOCUMENTS

| EP | 1 136 789 | 9/2001 |
|---|---|---|
| EP | 1 357 353 | 10/2003 |

* cited by examiner

*Primary Examiner*—Yaritza Guadalupe-McCall
(74) *Attorney, Agent, or Firm*—Lowe, Hauptman & Berner LLP

(57) ABSTRACT

The invention relates to a support frame positioning a laser beam level and comprises:
  a first support module 1 inclusive a reference element 10 that can be positioned against a planar surface and enganging elements 11 located in a longitudinal direction A1 to cooperate with a second support module 2 displaceable relative to the first support module 1,
  bracing means 22 on the second support module 2 to support a laser beam type level 3 and a motor 25 to power a drive shaft in either of two directions of rotation of at least one element translatable along the first support module 1, and
  a remote control for said motor 25.

The support frame may be positioned in height on walss and allows automatically positioning the laser beam in the continuous and progressive manner FIG. 1.

17 Claims, 4 Drawing Sheets

CONTROLLED SUPPORT FRAME TO POSITION A LASER LEVEL

FIELD OF THE INVENTION

The present invention relates to laser beam clinometers, hereafter laser beam inclination/slope levels, or also simply laser levels. Moreover the present invention relates more specifically to a controlled laser beam level.

DESCRIPTION OF THE RELATED ART

Levels are used in construction, for instance, to establish a horizontal surface mounted on posts or on side walls, to make a terrain level or for use by surveyors.

At present, setting up a laser level usually entails user implemented accurate adjustments perforce carried out by directly manipulating the laser level. More specifically, while there are slope-measuring laser levels, on the other hand no simple ways have to my knowledge been proposed to date to easily adjust a laser level into a horizontal or vertical plane, or in a sloping manner while also allowing easy adjustment of the height of a previously adjusted level.

Accordingly an object of the present invention is to overcome one or more drawbacks of the prior art by providing a laser beam level able to adjust its attitude when suspended while also allowing its height to be easily adjusted.

Another object of the present invention is to provide a new and improved laser level for allowing simultaneous and continuous and progressive adjusting of the attitude of a laser level beam and a level resting on a surface.

SUMMARY OF THE INVENTION

The foregoing objectives are attained by a controlled support frame which drives the attitude of a laser level that is fitted with a laser head for transmitting at least one laser beam, said laser level comprising:
  a first support module including a reference element that can be made to rest on a substantially planar surface,
  a second support module which is displaceable relative to the first module and fitted with a brace on which a laser type level rests,
  engaging elements located on the first support module in a direction parallel to a so-called longitudinal axis and cooperating with the second support module,
  at least one element in the second support module is arranged to drive in two directions of rotation a drive shaft for driving at least one element displaceable in translation in two directions along the longitudinal axis, the engaging elements of the first support module being fitted with at least one longitudinal contact surface having a given length to receive and position the translatable element of the second support module, and
  a remote control sub-assembly for the drive element.

In another feature of the present invention, the first support module comprises fasteners to affix and position the reference element on a substantially planar surface.

Accordingly the support frame of the present invention can be adjusted in height, for instance to put a level in position when installing dropped ceilings; the support frame can remotely-controlled.

In another feature of the present invention, the second support module comprises:
  a pivot shaft that rotationally supports a laser level, and
  locking elements to lock the laser level in a first angular position defined by the angle subtended between the longitudinal axis and the central axis of the laser level that passes through the laser head.

Accordingly the level can be inclined, so it can be used, for instance, when working on staircases, slopes and roofs.

In another feature of the present invention, the angle is between 90° and 180°.

In yet another feature of the present invention, the first support module comprises at least one extensible arm rigidly joined to the reference element to improve the dimensional stability of the first support module relative to the surface on which it is positioned.

In yet another feature of the present invention, the second support module has a rear side that interacts with the first support module and a front side that is fitted with a brace that supports the laser type lever, an elongated housing is located on the rear side and cooperates with at least one longitudinal groove that acts as a slide element for the first support module.

In yet another feature of the present invention, the element driving the drive shaft includes an electric motor connected to suitable electric power leads.

In yet another feature of the present invention, the support frame comprises a remote control for said motor.

Accordingly the user can control the height of the level without modifying the laser beam device adjustments.

In yet another feature of the present invention, the electric power leads connected to the motor are located in the brace and is fitted with a surface for contacting electric terminals of the level.

In yet another feature of the present invention, the electric power leads are used to remote-control the motor of the second support module by using electric remote-control actuation of the level.

In yet another feature of the present invention, the brace comprises lateral arms, each bearing a pivot shaft on which is mounted the laser beam type level, wherein the pivot axis is parallel to the drive shaft actuated by the motor of the second support module.

In yet another feature of the present invention, the second support module comprises at its front side a stop surface that receives the level when an imaginary central axis of the level traversing the laser head is parallel to the longitudinal axis; the pivoting axis is located such that the level can pivot between the rest position against the stop and an orthogonal position in which the central level axis is orthogonal to the longitudinal axis.

In yet another feature of the present invention, the brace has manual adjustment elements to incline the level.

In yet another feature of the present invention, the second support module has a manual drive knob aligned with the motor.

In yet another feature of the present invention, the second support module is an integral part of the level.

In yet another feature of the present invention, said brace of the second support module includes lateral arms for fastening the level and enabling the level to be manually separated from said second support module.

In yet another feature of the present invention, the longitudinal contact surface of given length is notched to be engaged by a displacement element, such as a gear.

In yet another feature of the present invention, the longitudinal contact surface is replaced by the surfaces of at least two pulleys or winders/unwinders that can translate a cable type displacing element.

The features and advantages of the above invention are elucidated in the description below and in relation to the attached illustrative and non-limiting embodiment modes.

BRIEF DESCRIPTION OF THE DRAWINGS

FIG. 3 is a diagram of an illustrative wall rest of a preferred embodiment of the invention.

DETAILED DESCRIPTION OF THE DRAWINGS

Figure 1:
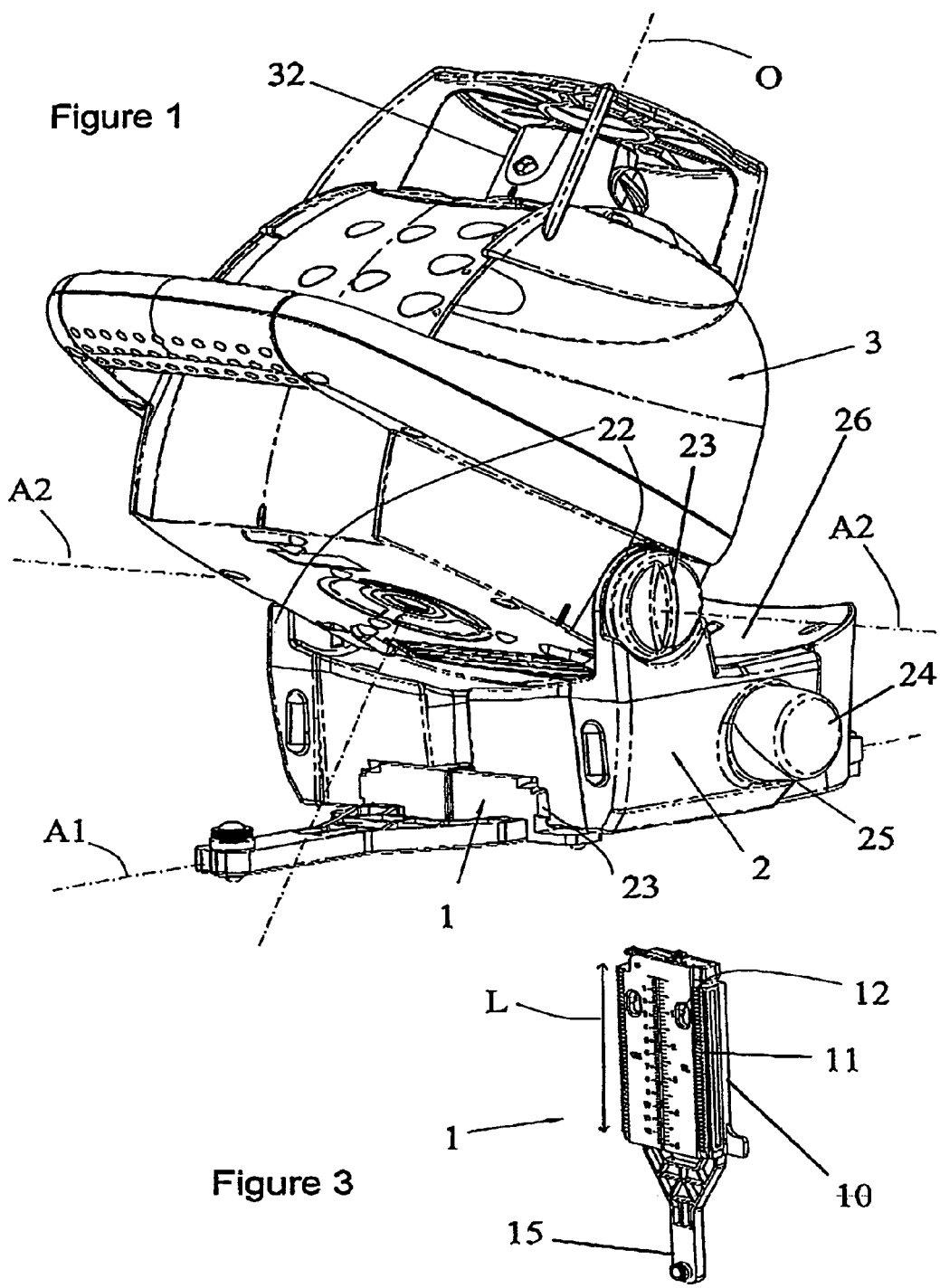
FIG. 1 is a perspective view of an illustrative embodiment of a support frame together with a laser level.

The controlled support frame of the figures allows a laser beam level 3 to be positioned in the vertical direction. In such a case the level 3, which is fitted with a laser head 32 for emitting at least one laser beam, can be set on the ground (for instance to align walls), and can be placed against a vertical wall. The laser level 3 can be construed in its broadest sense as being any laser level having on one hand a stationary case including a laser beam generator and a motorized module for rotating this beam, or for determining a line or a crosshair, and on the other hand a movable head 32 rigidly joined to the output end of a rotatably driven shaft. The movable head comprises optics for reflecting the laser beam transmitted from the shell enclosing the laser source. As shown in FIG. 1, the frame can comprise a dome for protecting the movable head 32 against any impacts. The support frame of the Figures is particularly appropriate for operational ranges between 0 and 150 m. The frame can be metallic or made of molded plastic and is equipped with gripping elements 31, e.g., in the form of one or several handles, or cavities engaged by fingers, etc. The frame can include a housing for receiving a battery, wherein the housing is closed by a detachable lid. The rechargeable batteries are 2.4 or 4.8 volts. This kind of compact (dimensions<1 m) and relatively lightweight laser level (in general between 2 and 4 kg) is easily mounted on a tripod or on a wall rest.

Figure 2:
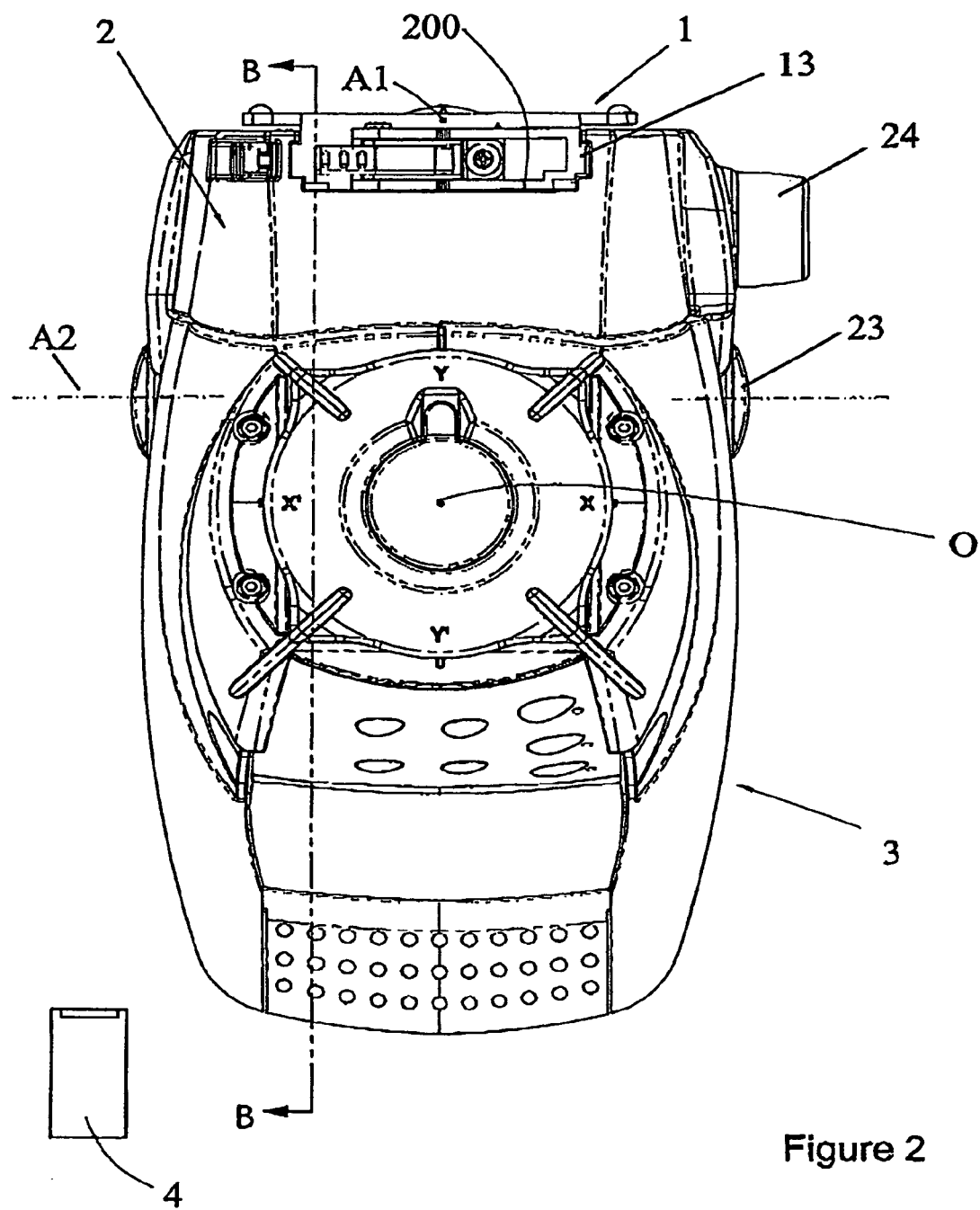
FIG. 2 is a bottom view of a support frame and laser level assembly that is mounted on a vertical wall.

The illustrated support frame allows level 3 to be slanted to determine the angle of an inclined plane, the desired inclination being preadjusted relative to a support frame sub-assembly. The design of the illustrated embodiment also allows the level to be operated at a given height or in a reference plane, e.g., to install a dropped ceiling. For that purpose and as shown in FIGS. 1 through 3, the support frame is modular, comprising on one hand a first modular support 1 which includes a reference element 10 that can be positioned on a substantially planar surface and on the other hand a second support module 2 that is displaceable relative to the first support module 1 associated with the level 3. This second support module 2 comprises brace arrangement 22 for supporting the level 3 as shown in FIG. 1.

Engaging elements 11 are located on the first support module 1 in a direction parallel to a so-called longitudinal axis Al to cooperate with the second support module 2. Fasteners 12 that allow inserts to be threaded or drilled in the wall, are also provided to position and affix in place the reference element 10 on the substantially planar wall surface. Moreover the first support module 1 can be fitted with at least one extensible arm 15 which is rigidly joined to the reference element 10 to improve the dimensional stability of the support module relative to the surface on which it is positioned.

Figure 4:
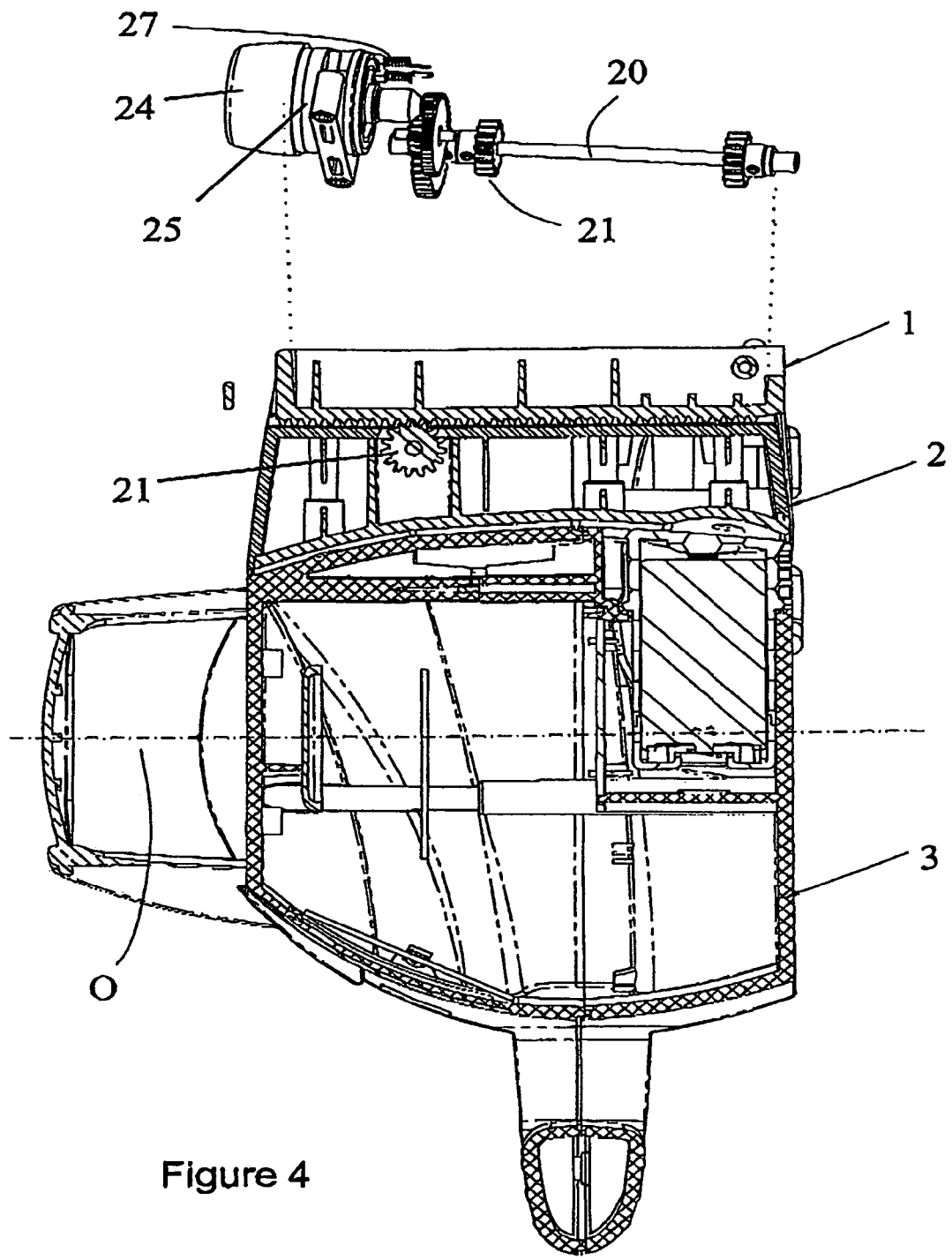
FIG. 4 is a sectional view along the section line BB of FIG. 2 of the assembly of a support frame and laser level and of the drive elements used in an embodiment of the invention.

The second support module 2 comprises at least one element that drives, in two directions of rotation, a drive shaft 20 that translates one or more displaceable elements 21 (FIG. 4) along the longitudinal axis A1. A motor 25, connected to electric power leads, can cause such displacements; the angular speed of the motor shaft is optionally variable. As regards the embodiment of FIGS. 3 and 4, the engaging elements 11 of the first support module 1 include at least one longitudinal contact surface of specified length L which is designed to receive and position the translatable element 21 of the second support module 2. The longitudinal contact surface of specified length L is, for example, notched or ribbed in order to receive a displacement element such as a gear. The drive shaft 20 can bear, or be used to drive such an element 21 in the form of a gear as shown in FIG. 4. In fact any kind of non-slip element can be used to drive the two support modules 1, 2 relative to each other. In this variation the longitudinal contact surface can be replaced by the surfaces of at least two pulleys or winders/unwinders to translate a cable type displacement means or a similar hoisting means.

As regards the embodiment of FIGS. 1, 2 and 4, the second support module 2 comprises a rear side that cooperates with the first support module 1 and an opposite front side which includes the brace 22 that supports the laser level 3. In order for modules 1, 2 to cooperate in a ganged manner, an elongated housing 200 (FIG. 2) is fitted into the rear side to receive a longitudinally projecting portion of the module 1 that constitutes a wall rest. Housing 200 cooperates with at least one longitudinal groove 23 that acts as a slide of the first support module 1. As shown in FIGS. 1 and 2, the stationary first support module 1 illustratively comprises lateral grooves that enter inner recesses in the sides of the housing 200. One or more stops can be used on the stationary support module 1 to stop/limit an excursion of the movable support module 2.

Figure 5A:
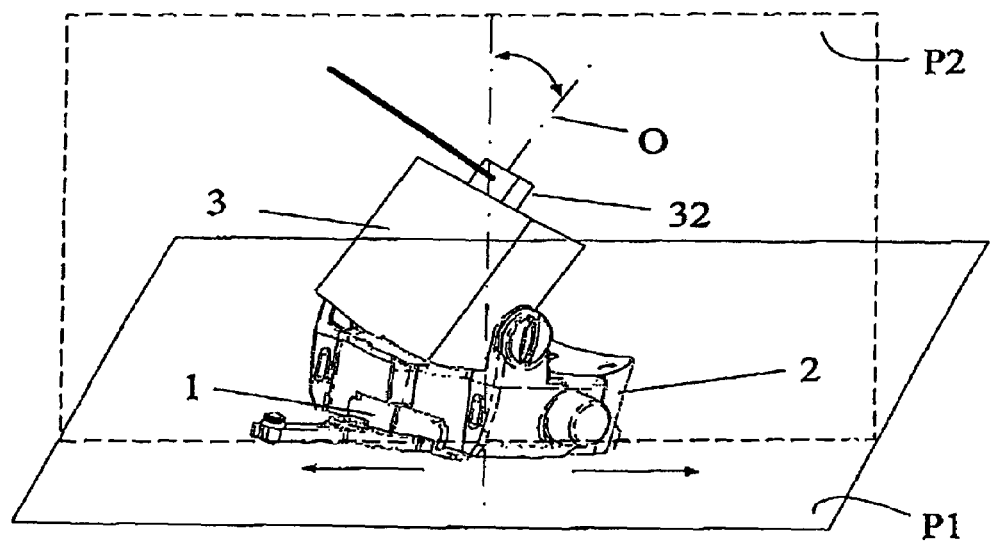
FIGS. 5a, 5b are illustrations of different laser head inclinations made possible by the invention.
Figure 5B:
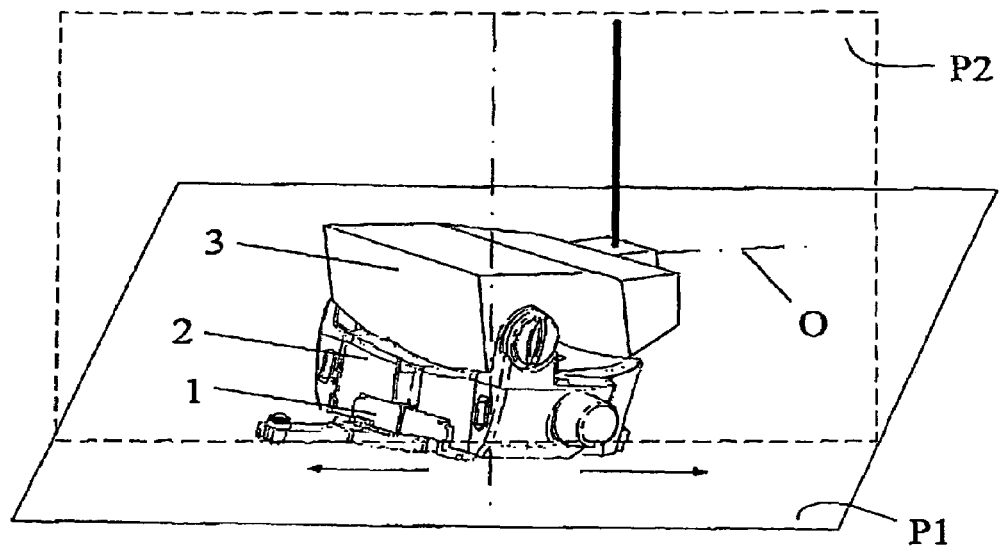

To incline the level at varying angles, the second support module 2 advantageously comprises a pivot shaft on which a laser level 3 is mounted in a rotational manner, said shaft also carrying elements for locking level 3 in an angular position defined by the angle O, A1 subtended between the longitudinal axis A1 and the central axis O of the level, which axis O passes through the laser head 32. The angle can vary between 90° and 180°. The brace 22 that supports the level 3 illustratively includes lateral arms each including a pivot shaft A2 on which rests the laser beam level. The pivot shaft A2 runs parallel to the drive shaft 20 driven by the motor 25 of the second support module 2. As regards FIG. 1, the front side of second support module 2 can be fitted with a stop surface 26 to receive the level 3 when the central axis O of the 15 level 3 crossing the laser head 32 is parallel to the longitudinal axis A1. In one embodiment, the pivot axes A2 are located to allow pivoting of the level 3 at least between the rest position against the stop 26 and an orthogonal position wherein the central axis O of the level 3 is orthogonal to the longitudinal axis A1. In this manner, different angles of inclination can be attained when the laser beam level 3 is suspended by the support frame against a vertical wall. Similarly, the support frame allows the height of the level 3 to be modified when level 3 rests on the ground and when the level rests on a tripod. Manual adjustment means 23 for controlling the inclination of the level 3 are provided on the brace 22 to allow pre-adjusting of the inclination of level 3 before vertical or lateral adjustment of the level in order to perform leveling on an inclined surface. As regards FIGS. 5a and 5b, by using these adjustment means 23, the laser beam can be inclined in the plane P2 passing through the longitudinal axis A1 while the beam is orthogonal to the plane P1 that includes the reference element of the first support module 1.

To attain accurate adjustments in a continuous and progressive manner when the laser level 3 is mounted on the illustrated support frame, a remote control sub-assembly for the motor 25 enables the second support module 2 to be displaced along the longitudinal axis A1. In general and depending on the location on the wall of the first support module, longitudinal axis A1 can be either vertical, as regards an adjustment in height, or horizontal, as regards a lateral adjustment. Remote control is feasible by using an infrared transmitter 4 (FIG. 2) or analog means (such as a radio or Bluetooth®). Such a remote control can be either conventional as regards laser beam levels, namely by controlling the rotational speed of the head 32 that moves the laser spot from left to right and vice-versa, by passing from spot mode to a rotational mode, or by sweeping etc. However the level 3 also can respond to certain commands differently when a particular mode has been triggered, in this instance an external positioning mode of the level 3. Such a mode can be triggered by applying, for a sufficiently long time (greater than or equal to 2 or even 5 seconds), a pressure to activate this mode. After such a time delay, some commands will enable the position of the second support module 2 to be adjusted along the first support module 1.

Electric leads are provided to establish remote-control of the motor 25 of the second support module 2. Illustratively electric control elements for the level 3 that provide controlled leveling are activated by electrically driving motor 25 in either direction of rotation; the polarity of the electric drive is inverted to change the direction of rotation of the drive shaft 20 and therefore the direction of motion along the longitudinal axis A1.

The commands between the level 3 and the movable support module 2 are transmitted by the electric leads designed to actuate the motor 25. These leads (not shown) illustratively are located in bracing means 22 of the second support module 2 and are fitted with a contact interface to the electric leads of the laser level 3. The contact interfaces can be in the form of simple electrical contacting screws or equivalent conducting inserts. It should be borne in mind that the remote control 4 also can cause the pivoting motion of the level 3 about the pivot axes A2. In a variation, the support frame can be independent and illustratively can comprise electric batteries integrated into the second support module 2.

As shown in FIG. 1, the second module 2 includes a manual actuation knob 24 which is aligned with the motor 25. Illustratively such a knob 24 is designed to activate or shut off the motor 25. As shown in FIG. 4, this knob can be associated with a trigger element 27 allowing automatic disengagement of the knob beyond a given operational time interval to preclude the danger of not disengaging, i.e. forgetting to disengage the external positioning mode of the level 3.

The second support module 2 can be an entirely integral part of the level 3, just as it can also be a detachable, separate module. In one embodiment, the brace 22 of the second support module 2 includes symmetrical, lateral affixation arms of the level 3, including fasteners for allowing level 3 to be manually separated from the second support module 2.

One of the advantages offered by the present invention is that it introduces new ways of positioning a laser level, thereby making the job of a user of the level much easier, while allowing accurate remote control.

It is clear to those of ordinary skill that the present invention allows many other specific embodiment modes without transcending the scope of the present invention as defined in the appended claims.

The invention claimed is:

1. A controlled support frame for positioning a laser level comprising a laser head for transmitting at least one laser beam, said support frame comprising:
  a first support module including a reference element that can be positioned on a substantially planar surface,
  a second support module which is displaceable relative to the first support module and which includes a brace to support a laser-beam type level,
  engaging elements located on the first support module in a direction parallel to a longitudinal axis, the engaging elements being arranged to cooperate with the second module,
  at least one drive element located in the second support module for driving in both directions of rotation a drive shaft for reciprocally driving at least one reciprocable element along said longitudinal axis, the engaging elements of the first support module comprising at least one longitudinal contact surface for receiving and positioning said reciprocable element of the second support module, said drive element for driving the drive shaft including a motor connected to electric leads, said motor being controllable by a remote distant controller.

2. Support frame as claimed in claim 1, wherein the first support module comprises fasteners to position and affix the reference element to a substantially planar surface.

3. Support frame as claimed in claim 1, wherein the second support module comprises:
  a pivot shaft for bearing a rotatable laser level,
  locking elements for locking the level in an angular position defined by an angle subtended between the longitudinal axis and a central axis of the level passing through the laser head.

4. Support frame as claimed in claim 3, wherein said angle is in the range between 90° and 180°.

5. Support frame as claimed in claim 1, wherein the second support module comprises a rear side for cooperating with the first module and a related front side fitted with a brace for bracing the laser beam level, further including an elongated housing on said rear side for cooperating with at least one longitudinal groove arranged to act as a slide in the first support module.

6. Support frame as claimed in claim 1 wherein the remote distance controller for said motor is for providing control of the level of the laser head.

7. Support frame as claimed in claim 1, wherein the electric leads connected to the motor are located in said brace and comprise an interface contacting electric terminals of the level.

8. Support frame as claimed in claim 7, wherein the electric terminals allow remote controlling of the motor of the second support module in response to electric commands from the level.

9. Support frame as claimed in claim 1, wherein the brace comprises lateral arms each including a pivot shaft for carrying the laser type level, said pivot shaft being parallel to the drive shaft arranged to be driven by the motor of the second support module.

10. Support frame as claimed in claim 9, wherein the second support module comprises at its front side a surface stop for receiving the level when a central axis of the level that passes through the laser head is parallel to the longitudinal axis, said pivot shafts being located to allow pivoting of the level at least between a position of rest against the stop and an orthogonal position, the central axis of the level being orthogonal to said longitudinal axis.

11. Support frame as claimed in claim 9, wherein said brace includes manual elements for adjusting the inclination of the level.

12. Support frame as claimed in claim 1, wherein the second support module includes a manual drive knob aligned with the motor.

13. Support frame as claimed in claim 1, wherein the second support module can not be detached from the level.

14. Support frame as claimed in claim 1, wherein the brace of the second support module includes_symmetric, lateral arms for affixing the level, the arms including—fasteners for enabling the level to be manually separated from the second support module.

15. A controlled support frame for positioning a laser level comprising a laser head for transmitting at least one laser beam, said support frame comprising:
- a first support module including a reference element that can be positioned on a substantially planar surface,
- a second support module which is displaceable relative to the first support module and which includes a brace to support a laser-beam type level,
- engaging elements located on the first support module in a direction parallel to a longitudinal axis, the elements being arranged to cooperate with the second module,
- at least one drive element located in the second support module for driving in both directions of rotation a drive shaft for reciprocally driving at least one element along said longitudinal axis, the engaging elements of the first support module comprising at least one longitudinal contact surface for receiving and positioning said reciprocable element of the second support module, the first support module comprising at least one extensible arm rigidly joined to the reference element to increase the dimensional stability between the first support module and the surface on which it is positioned.

16. A controlled support frame for positioning a laser level comprising a laser head for transmitting at least one laser beam, said support frame comprising:
- a first support module including a reference element that can be positioned on a substantially planar surface,
- a second support module which is displaceable relative to the first support module and which includes a brace to support a laser beam type level,
- engaging elements located on the first support module in a direction parallel to a longitudinal axis, the elements being arranged to cooperate with the second module,
- at least one drive element located in the second support module for driving in both directions of rotation a drive shaft for reciprocally driving at least one element along said longitudinal axis, the engaging elements of the first support module comprising at least one longitudinal contact surface for receiving and positioning said reciprocable element of the second support module, said longitudinal contact surface having a length, and is notched or ribbed to receive a gear type displacement element.

17. A controlled support frame for positioning a laser level comprising a laser head for transmitting at least one laser beam, said support frame comprising:
- a first support module including a reference element that can be positioned on a substantially planar surface,
- a second support module which is displaceable relative to the first support module and which includes a brace to support a laser beam type level,
- engaging elements located on the first support module in a direction parallel to a longitudinal axis, the elements being arranged to cooperate with the second module,
- at least one drive element located in the second support module for driving in both directions of rotation a drive shaft for reciprocally driving at least one element along said longitudinal axis, the engaging elements of the first support module comprising at least one longitudinal contact surface for receiving and positioning said reciprocable element of the second support module, said longitudinal contact surface being replaceable by the surfaces of at least two pulleys or winders/unwinders to allow a cable type element to be translated.

* * * * *